United States Patent [19]

Kreutzer et al.

[11] Patent Number: 4,666,495
[45] Date of Patent: May 19, 1987

[54] APPARATUS FOR MANUFACTURING STRIA-FREE, BUBBLE-FREE AND HOMOGENEOUS QUARTZ-GLASS PLATES

[75] Inventors: Karl Kreutzer; Fritz Simmat, both of Gelnhausen, Fed. Rep. of Germany

[73] Assignee: Heraeus Quarzschmelze GmbH, Hanau, Fed. Rep. of Germany

[21] Appl. No.: 848,352

[22] Filed: Apr. 4, 1986

Related U.S. Application Data

[60] Division of Ser. No. 726,217, Apr. 23, 1985, Pat. No. 4,612,023, which is a continuation of Ser. No. 501,478, Jun. 6, 1983, abandoned.

[30] Foreign Application Priority Data

Jul. 15, 1982 [DE] Fed. Rep. of Germany ....... 3226451

[51] Int. Cl.[4] .......................... C03B 19/02; C03B 5/02
[52] U.S. Cl. ........................................ 65/258; 65/227; 65/335; 65/355; 65/374.13; 65/374.15; 65/DIG. 4; 373/30
[58] Field of Search ................ 65/32, 83, 85, 90, 99.1, 65/67, 157, DIG. 4, DIG. 8, 258, 259, 227, 184, 335, 347, 355, 356, 374.15, 374.13; 373/27, 33, 39, 140, 156, 157, 163, 30; 156/624; 425/447, DIG. 13; 249/78, 134, 135; 164/338.1, 250.1

[56] References Cited

U.S. PATENT DOCUMENTS

| 1,439,410 | 12/1922 | Gray | 65/374.13 |
| 1,603,221 | 10/1926 | Thomson | 373/27 X |
| 2,924,046 | 2/1960 | Cummins | 65/DIG. 8 |
| 3,025,146 | 3/1962 | Runyan | 65/184 X |
| 3,717,450 | 2/1973 | Loughridge | 65/32 X |

FOREIGN PATENT DOCUMENTS 1060772 7/1959 Fed. Rep. of Germany ........ 373/30

Primary Examiner—Kenneth M. Schor
Attorney, Agent, or Firm—Sprung Horn Kramer & Woods

[57] ABSTRACT

A method of manufacturing practically stria-free, bubble-free, and homogeneous quartz-glass plates of any desired configuration and with a surface area that exceeds the cross-section of the full circular quartz-glass cylinder that is employed as a starting material. The cylinder is continuously lowered into a furnace shell flooded with an inert gas, in which it is heated to a flowing temperature in the range of 1700° to 1900° C. until some of the quartz-glass flows off into a graphite crucible. The crucible is preferably clad with zirconium-oxide.

7 Claims, 1 Drawing Figure

U.S. Patent  May 19, 1987  4,666,495
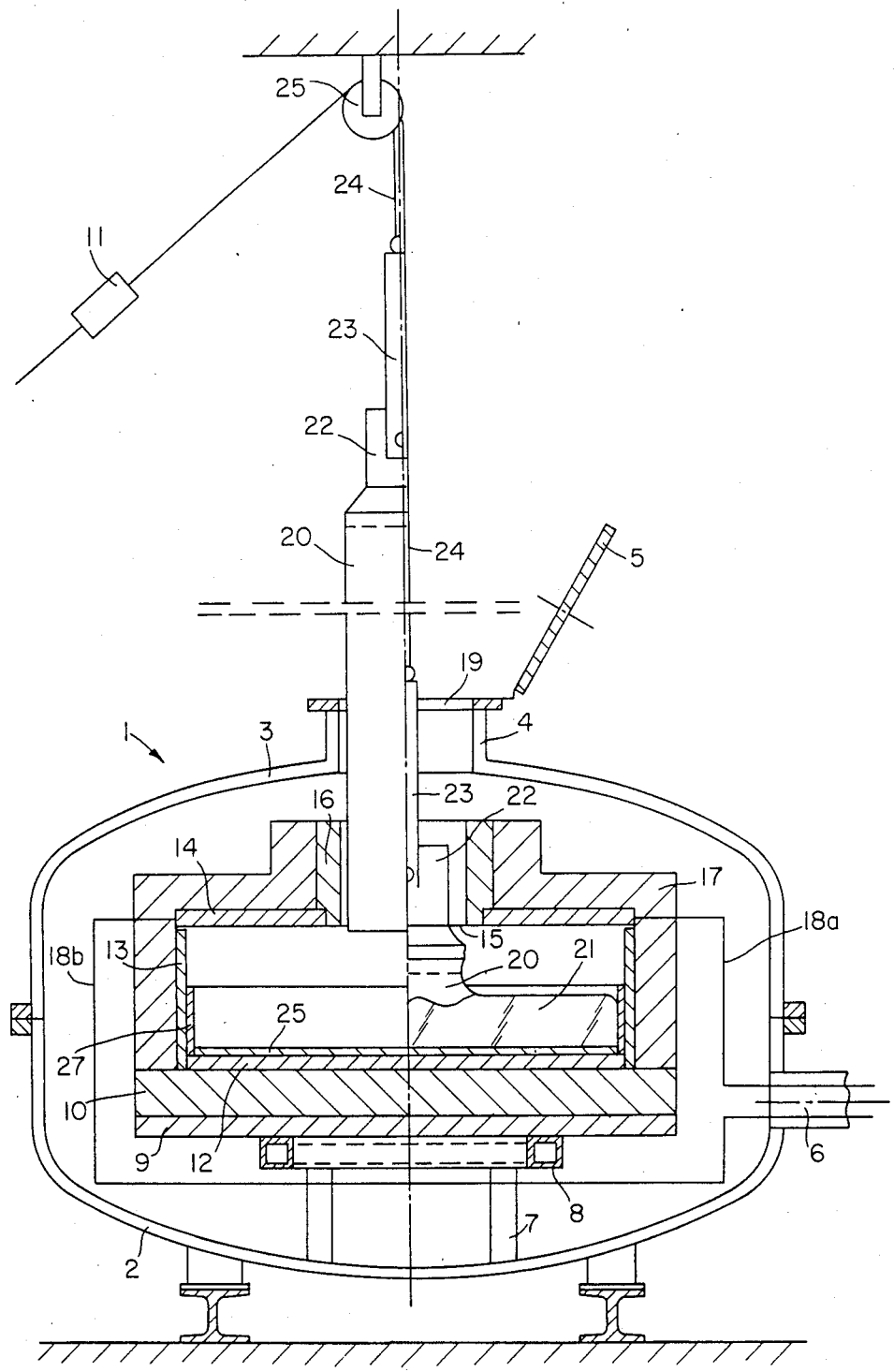

APPARATUS FOR MANUFACTURING STRIA-FREE, BUBBLE-FREE AND HOMOGENEOUS QUARTZ-GLASS PLATES

This is a division of application Ser. No. 726,217, filed 4/23/85, now U.S. Pat. No. 4,612,023 and which is a continuation of Ser. No. 501,478 filed 6/6/83 (abandoned).

BACKGROUND OF THE INVENTION

1. Field of the Invention

The invention concerns a method of manufacturing practically stria-free, bubble-free, and homogeneous quartz-glass plates of any desired configuration from a virtually stria-free, bubble-free and homogeneous full quartz-glass cylinder as well as a device for carrying out the method.

Virtually stria-free, bubble-free, and homogeneous quartz-glass should be understood to mean glass that exhibits no or only very few strias when its transparent surfaces are tested with test equipment, that has a mean overall bubble cross-section of less than 0.1 mm$^2$/100 cm$^3$ (Bubble Classes 1 and/or 0), and that exhibits a $\Delta$n lower than $2\times10^{-6}$ at a test aperture of 70 mm when tested with an interferometer.

2. Discussion of the Prior Art

A method of manufacturing planar article from molten quartz with electric resistance furnaces is known from German Pat. No. 445 763. In this method, a rod-shaped electric heating resistance is surrounded with the starting material to be melted. The current of heat produces a tubular blank, from which then the resistance is immediately withdrawn, and thereafter the blank which is still soft is compressed into a plate-shaped body.

The manufacture of bubble-free quartz-glass articles is known from German Pat. No. 697 699. The most frequent starting material is clear pieces of quartz obtained from rock crystal that are melted and then shaped conventionally. The manufacture of quartz-glass articles by cold-manufacturing articles of the desired shape from silicic-acid powder and then heating them in an electric furnace under vacuum until they become vitreous is also known from that document. The manufacture of blocks of quartz from granular material under vacuum that are subsequently reheated and compressed into their final form is also known.

Although the aforementioned methods of manufacture result in products that still contain bubbles, even when the products are specified to be bubble-free in German Pat. No. 697,699, U.S. Pat. No. 2,726,487 discloses manufacture of essentially bubble-free, that is rather low-bubble content, clear quartz products by impregnating a granular starting material such as pure quartz sand with a silicate solution and drying the liquid components until SiO$_2$ precipitates in the pores of the starting material, which is then melted down under vacuum in a graphite crucible. The result is transparent planar bodies of quartz-glass with only few bubbles.

A method of manufacturing plate-shaped bodies of quartz is know from German Pat. No. 549 083. The material to be melted, which consists of fine moist quartz sand, is placed in a flat cylindrical recess in a silicon-carbide stone. The material is then melted with flames from a current of heating gas that emerges from a hood positioned above it. The quartz sand that is placed in the cylindrical recess (to a height of 8 cm) is melted only part of the way through and the plate of quartz, which is 3 cm thick in the center and 2.5 cm thick at the edge, obtained in this way is still positioned on fine quartz sand. The heat that is focused on the material to be melted from above diffuses in all directions because the silicon carbide stones are good heat conductors, meaning that the heat flows off laterally through the stones.

The manufacture of stria-free, bubble-free, and homogeneous quartz-glass plates of any desired given configuration by sawing a plate off a practically stria-free, bubble-free, and homogeneous full quartz-glass cylinder with a circular cross-section and then cutting the resulting round plate to the desired configuration, rectangular for example, is also known. This method is of course restricted to the manufacture of quartz-glass plates with surface areas that are smaller than the circular cross-section of the cylinder.

The objective of the present invention is accordingly a method of manufacturing quartz-glass plate from a full quartz-glass cylinder by which the surface area of the resulting large plate may be of any desired shape and essentially larger than the cross-section of the cylinder.

The invention achieves this objective in accordance with a method wherein for the manufacture of large quartz-glass plates with a surface area that is essentially larger than the cross-section of the full cylinder at right angle to the axis of the cylinder, the free end of a full quartz-glass cylinder is lowered vertically into a graphite crucible, preferably clad with zirconium oxide, positioned inside a shell flooded with an inert gas, the cylinder is heated to a flow-temperature ranging from 1700° to 1900° C. and, when this temperature has been attained, further lowered until the quartz-glass flows off into contact with the bottom of the crucible, the cylinder is heated until the level of the quartz-glass that has flowed off into the crucible equals the thickness of the desired plate and in that, cooling quartz-glass that has flowed off said quartz-glass cylinder, removing the remainder of the full cylinder which has not flowed off and removing the cooled quartz-glass which has flowed off the cylinder from the crucible in the form of a plate.

The crucible can be of any size or shape. Hence, the bottom can have any configuration or as result of which the stria-free, bubble-free, homogeneous quartz-glass plate can have any desired shape. The process also allows infinite selection of the plate's thickness.

The process is preferably performed by initially evacuating the shell, thereafter heating the same to 1500° to 1700° C. before the shell is flooded with inert gas, which is preferably nitrogen.

Preferably the quartz-glass cylinder from which the quartz-glass is flowed off is lowered into the cylinder through an electric heater positioned above the graphite crucible in the shell. The full quartz-glass cylinder is introduced into the crucible at a rate such that 40–60 kg of quartz-glass flow off of the cylinder per hour. Generally, the full quartz cylinder is lowered into position, heated to its flowing temperature and maintained at that position for at least 0.5 hour.

The method in accordance with the invention permits for the first time the manufacture of quartz-glass plates of an especially high optical quality in any desired configuration and with dimensions that considerably exceed those of the full-quartz cylinder employed as a starting material. It must also be emphasized that the flow-off process employed in accordance with the invention considerably improves the homogeneity of the starting material while the other material properties, freedom from stria and bubbles, match those of the starting material and are retained. Furthermore, any stria already present in the starting material are more uniformly distributed and the bubble content is decreased as a result of diffusion. Quartz-glass plates manufactured by the method in accordance with the invention have turned out to be not only practically stria-free but also free of bubbles and to exhibit a homogeneity of better than $\Delta n = 8 \times 10^{-6}$ (at a test aperture of 700 mm) for a starting-material $\Delta n$ of $1 \times 10^{-5}$ (at a test aperture of 230 mm).

BRIEF DESCRIPTION OF DRAWING

The left side of the single schematic FIGURE shows the position of the full quartz-glass cylinder during the heating-up phase and the right half of the position of the cylinder toward the end of the flow-off process.

DESCRIPTION OF SPECIFIC EMBODIMENT

Referring to the drawing, a water-cooled furnace shell 1 consists of a bottom 2 and a top 3, which are connected vacuum tight. Shell top 3 has a flange connection 4 that can be closed vacuum-tight with a cover 5. A connection 6 is positioned at shell bottom 2 and can be connected to a vacuum pump or inert gas container such as a nitrogen bottle. Inside the shell is a charging table 7 that is preferably cooled.

A graphite supporting plate 9, covered with a layer 10 of carbon foam or felt, is positioned on the surface 8 of charging table 7. A graphite crucible, consisting of a bottom plate 12 and wall plate 13, is built onto layer 10. Bottom plate 12 is covered with a layer 26 of zirconium oxide that consists of a granular coating and of a coating of felt over the granulate. Wall plates 13 are covered with fiber plates 27 of zirconium oxide. A graphite heating plate 14 with an access opening 15 is positioned on the upper edge of the crucible. A graphite sleeve 16 extends up from access opening 15. The outside of the walls of the crucible, the graphite heating plate, and the graphite sleeve is covered with carbon-foam or carbon-felt insulating bodies 17. Graphite heating plate 14 is supplied with alternating current through connection 6 over electric-power supply lines 18a and 18b from a source that is not illustrated.

The method of manufacturing quartz-glass plates with the device just described will now be specified.

Flanged connection 19 in shell top 3 is closed, shell 1 evacuated through connection 6, preferably to a pressure of approximately 1 mbar, and graphite heating plate 14 supplied with current, heating the shell to a temperature in the range of 1500° to 1700° C. When the pressure is about 1 mbar, the vacuum pump is turned off and the shell flooded with nitrogen at normal atmospheric pressure. Cover 5 is is removed from flanged connection 4, and a full quartz-glass cylinder 20 lowered into the shell to the position shown on the left of the FIGURE. In this position, the free end of cylinder 20 is heated to a flowing temperature in the range of 1700° to 1900° C. and, once this temperature is attained, lowered again until it comes into contact with the floor of the graphite crucible so that the quartz-glass will flow off. Cylinder 20 continues to be heated until the level of the quartz-glass that has flowed off into the crucible equals the thickness of the desired plate. Graphite sleeve 16 is used to preheat the cylinder in such a way that its temperature will increase from top to bottom. The cylinder is introduced at such a rate and the flowing temperature maintained such that about 40–60 kg of quartz-glass will flow off per hour.

Cylinder 20 is fused with a pipe component 22 attached to a suspension device 23 that is preferably cooled and that is attached to a steel cable wound over a deflection pulley 25 on a capstan that is not illustrated. As soon as the level of the quartz-glass that has flowed off into the crucible equals the thickness of the desired plate, which will occur once the cylinder has been lowered into the position illustrated on the right of the FIGURE, the lowering of the cylinder is stopped and the quartz-glass that flowed off is maintained at the flowing temperature for at least 0.5 hours. The quartz-glass that has flowed off is then cooled and the remainder of the full cylinder is separated from the quartz-glass that has flowed off, which is then removed from the crucible in the form of a plate.

Full quartz-glass cylinder 20 is lowered into the graphite crucible with a capstan that is not illustrated and that is controlled in such a way that the constant decrease in weight can be monitored with a tension dynamometer 11.

Interrupting the cooling of the quartz-glass that has flowed off after a temperature of approximately 1100° C. has been attained to subject the glass to tempering with graphite heating plate 14 before it cools off completely is practical and desirable, in some instances.

The method in accordance with the invention has been successfully employed to manufacture quartz-glass plates measuring $1000 \times 1000$ mm and with a thickness of 80 mm from a full quartz-glass cylinder with a diameter of 200 mm and a height of 3000 mm.

The invention is naturally not restricted to full quartz-glass cylinders manufactured from natural quartz cyrstals but is also appropriate when employed similarly with full cylinders manufactured from synthetic quartz-glass.

What is claimed is:

1. A device for forming a substantially stria-free, bubble-free, homogeneous plate of quartz-glass comprising a shell having a closeable opening, a means for evacuating said shell, a cover means for covering said shell, a graphite crucible shaped for casting said plate and disposed within said shell, said crucible having a bottom that is completely clad with zirconium oxide and walls that are clad with zirconium oxide at least to a given height, which height equals the thickness of a quartz-glass plate to be manufactured, an electric heater in said shell disposed above said crucible, said heater having an opening therethrough, said opening being sufficiently large in cross-section to permit a solid quartz-glass rod suspended vertically on an infeed defice to be passed therethrough and said heater including a sleeve for preheating the cylinder such that the temperature is increased from top to bottom of the rod and said heater also including a means, extending from said sleeve at an angle away from said sleeve, for heating the inside of said shell, and an infeed device for providing a quartz-glass rod and feeding it through said sleeve.

2. A device according to claim 1, wherein the bottom of the graphite crucible is covered with granulated zirconium oxide that is covered in turn with a layer of zirconium-oxide felt.

3. A device according to claim 1, wherein the inside of the walls of the graphite crucible are covered with plates of zirconium-oxide felt.

4. A device according to claim 1, wherein the means extending from said sleeve which is included in the electric heater comprises a graphite plate disposed on an upper edge of the graphite crucible.

5. A device according to claim 1, wherein said sleeve is a graphite sleeve which extends from said opening of the heater toward a flange connection disposed about said opening.

6. A device according to claim 1, wherein a full quartz-glass rod fused with a pipe component attached to a suspension device that is attached to a cable wound on a capstan is disposed within said crucible.

7. A device according to claim 1, which further comprises said sleeve being a graphite sleeve extending from the crucible.

* * * * *